US012734924B2

(12) United States Patent
Sakamoto et al.

(10) Patent No.: US 12,734,924 B2
(45) Date of Patent: Sep. 15, 2026

(54) PRECHARGE CONTROL METHOD AND POWER STORAGE SYSTEM OF ELECTRIC VEHICLE

(71) Applicant: HONDA MOTOR CO., LTD., Tokyo (JP)

(72) Inventors: Hideki Sakamoto, Saitama (JP); Yasuo Yamada, Saitama (JP); Soichi Morii, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/045,591

(22) Filed: Feb. 5, 2025

(65) Prior Publication Data

US 2025/0256606 A1 Aug. 14, 2025

(30) Foreign Application Priority Data

Feb. 13, 2024 (JP) ................................ 2024-019831

(51) Int. Cl.

*B60W 20/13* (2016.01)
*B60L 53/24* (2019.01)
*B60L 53/62* (2019.01)

(52) U.S. Cl.

CPC ............... *B60L 53/62* (2019.02); *B60L 53/24* (2019.02)

(58) Field of Classification Search

CPC .......... B60L 53/62; B60L 53/24; H02J 7/0024
See application file for complete search history.

(56) References Cited

U.S. PATENT DOCUMENTS

2003/0146726 A1* 8/2003 Ishikawa ................ B60L 50/61 903/903
2011/0234177 A1* 9/2011 Kohara .................. H02M 1/36 320/166
2021/0036643 A1* 2/2021 Wang ....................... B60K 6/48
2022/0311334 A1* 9/2022 Mitani .................. H02J 7/0063
2023/0402870 A1* 12/2023 Kamel .................. H02J 7/1423
2025/0202270 A1* 6/2025 Takashima ........... H02M 7/483

FOREIGN PATENT DOCUMENTS

JP 6759216 B2 9/2020

* cited by examiner

*Primary Examiner* — Ryan Johnson
*Assistant Examiner* — Esayas G Yeshaw
(74) *Attorney, Agent, or Firm* — Paratus Law Group, PLLC

(57) ABSTRACT

A precharge control method for an electric vehicle, which includes: a battery configured to be switched, by switching an internal switch, between a first voltage state capable of outputting a first voltage and a second voltage state capable of outputting a second voltage higher than the first voltage; and a capacitor, includes: in a case of charging the battery at the second voltage, precharging the capacitor under a condition of the battery in the first voltage state set by switching the internal switch.

10 Claims, 18 Drawing Sheets

1
2
21
22
S/C_A
S/C_B
S/C_C
V
V_BATT
A
IS
R1
P/C
M/C
FUSE
CONTROL UNIT
10
V_QC
QC/C_A
QC/C_B
QC/C_C
VS/C
13N
13P
111N
111P
112N
112P
12N
12P
11N
11P
14
DCDC
6
AUXILIARY DEVICE
4
131N
131P
V_PIN
R2
C1
INV
5
34
33U
33V
33W
32U
32V
32W
31
3

*FIG. 2*
(800 V START-UP)
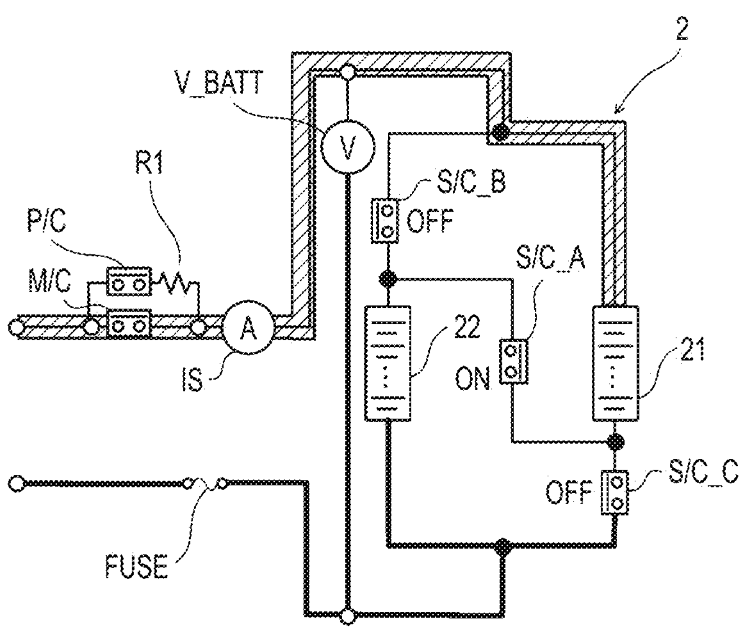
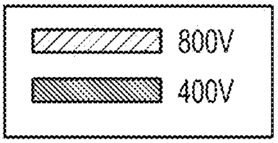

*FIG. 3*
(400 V START-UP)
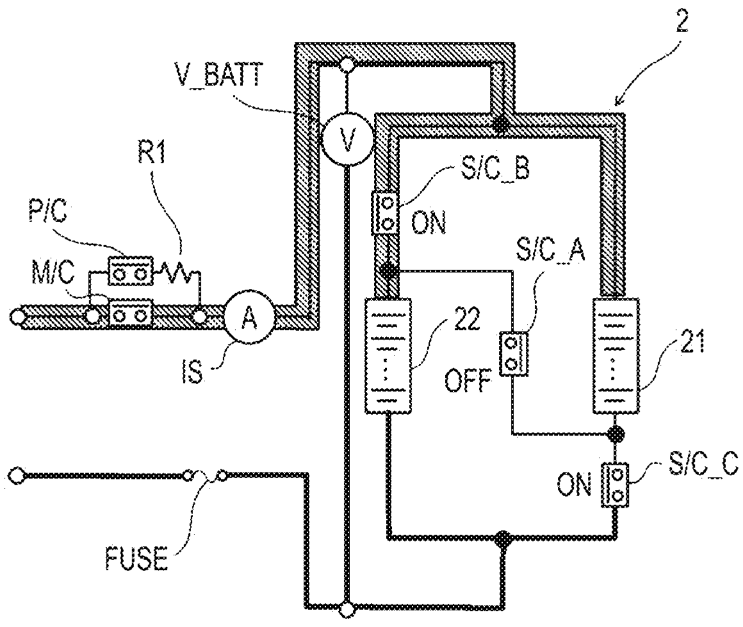
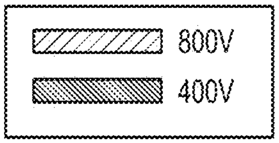

FIG. 4 (800 V DRIVING)
131N
13N
131P
13P
1
2
DCDC
6
QC/C_A
V_QC
QC/C_B
OFF
OFF
OFF
14
14
QC/C_C
V_BATT
P/C_A
R1
S/C_B
OFF
S/C_A
33U
33V
34
32U
ON
13P
22
21
INV
11P
112P
VS/C
111P
13N
M/C
ON
IS
ON
32V
31
32W
112N
S/C_C
OFF
3
33W
5
C1
R2
V_PIN
11N
12P
12N
111N
FUSE
AUXILIARY DEVICE
4
800V
400V

FIG. 5 (800 V CHARGING)
800V
400V
2
21
22
S/C_A
S/C_B
S/C_C
ON
OFF
V_BATT
V
A
IS
R1
P/C
M/C
FUSE
1
V_QC
QC/C_A
QC/C_B
QC/C_C
VS/C
13N
13P
111P
111N
112N
112P
12N
12P
11P
11N
14
DCDC
6
AUXILIARY DEVICE
4
131N
131P
V_PIN
R2
C1
INV
5
34
33U
33V
33W
32U
32V
32W
31
3

FIG. 6 (400 V CHARGING)
2
1
21
22
S/C_A
S/C_B
S/C_C
ON
OFF
800V
400V
V_BATT
V
A
IS
R1
P/C
M/C
FUSE
13N
111N
13P
111P
V_QC
QC/C_B
QC/C_A
QC/C_C
VS/C
112N
112P
12N
12P
14
DCDC
6
11P
11N
AUXILIARY DEVICE
4
131N
131P
V_PIN
R2
C1
INV
5
34
33U
33V
33W
32U
32V
32W
31
3

*FIG. 11*
(400 V START-UP)
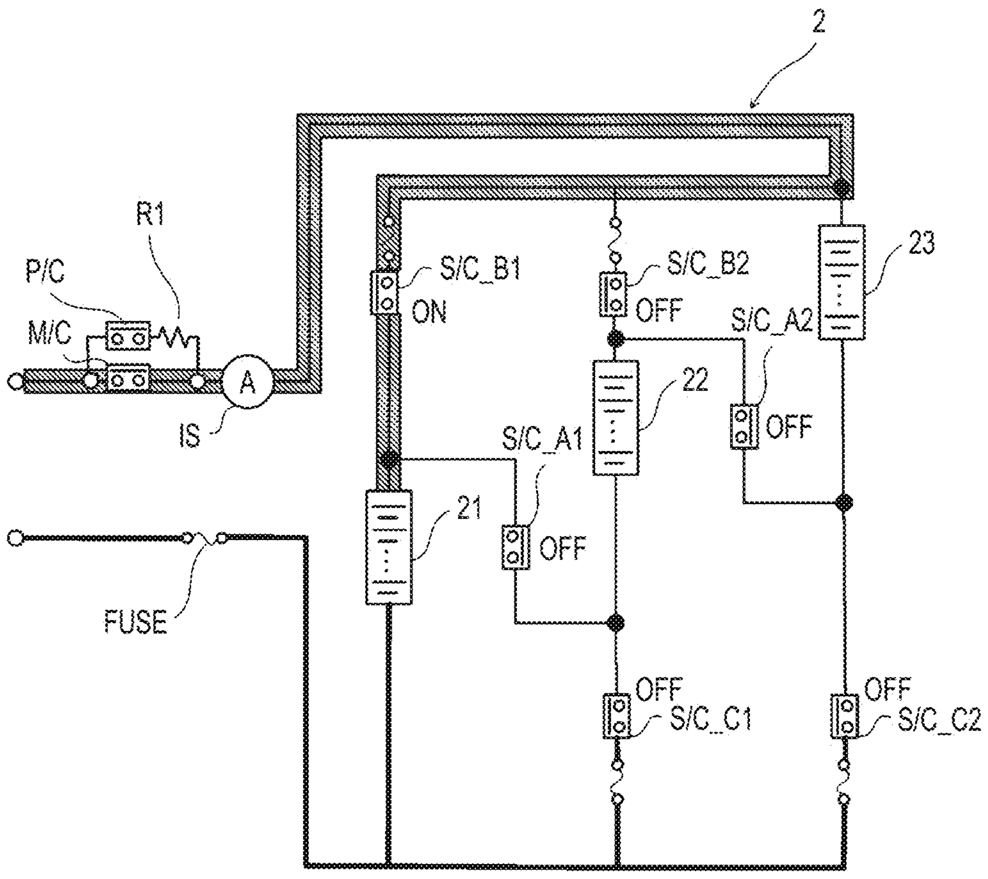
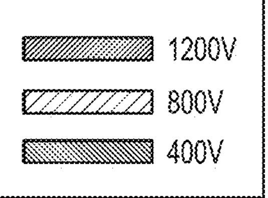

*FIG. 12*
(800 V START-UP)
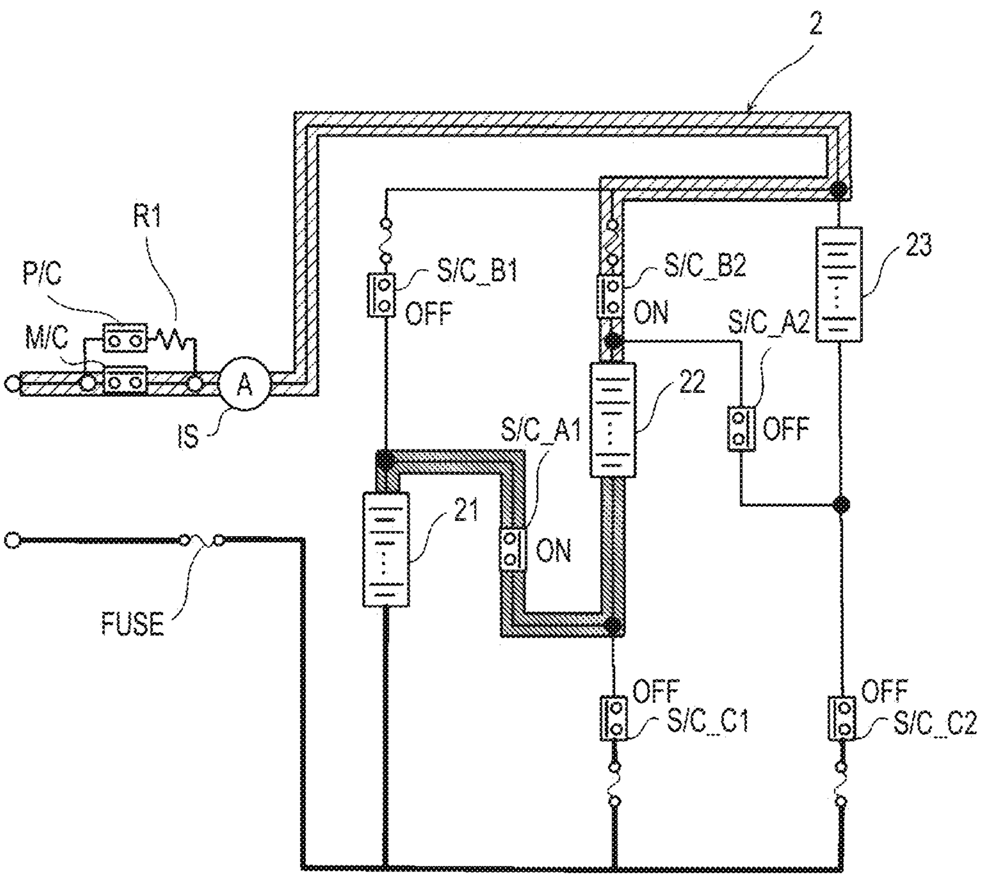
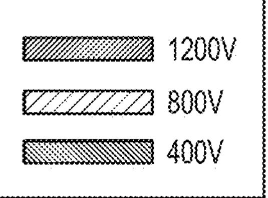

FIG. 13
(1200 V START-UP)
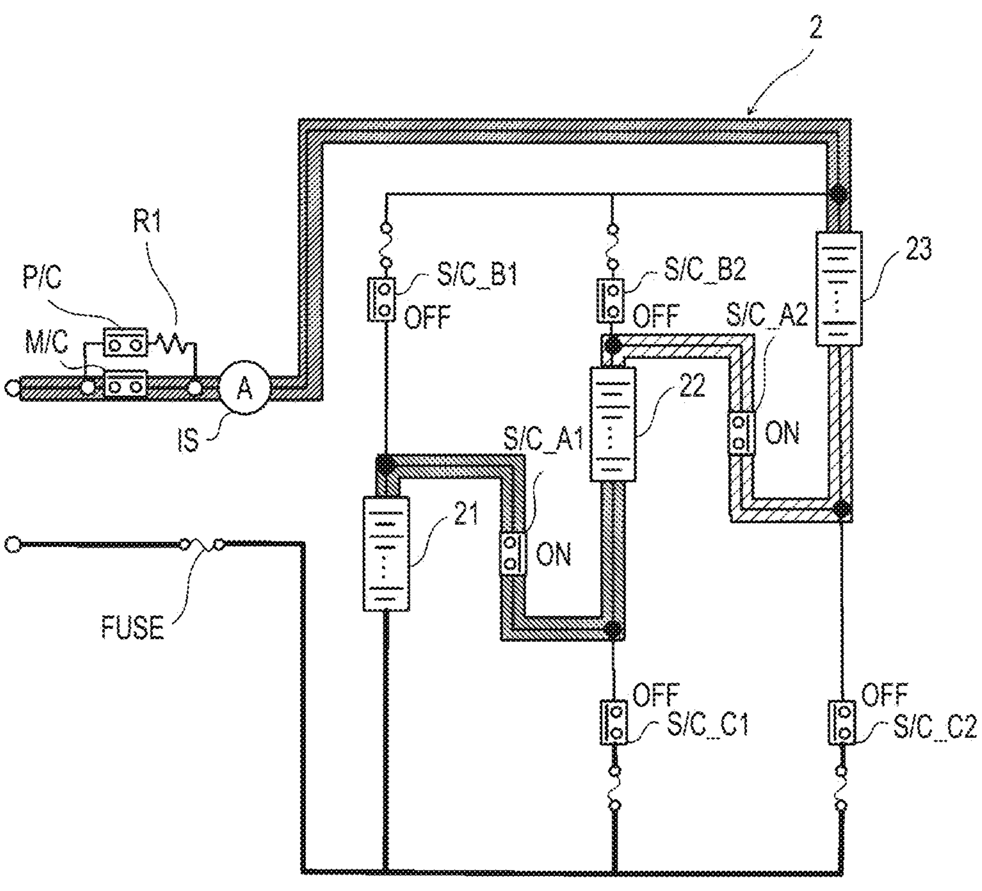
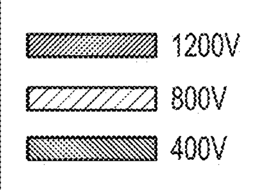

*FIG. 16*
(400 V START-UP)
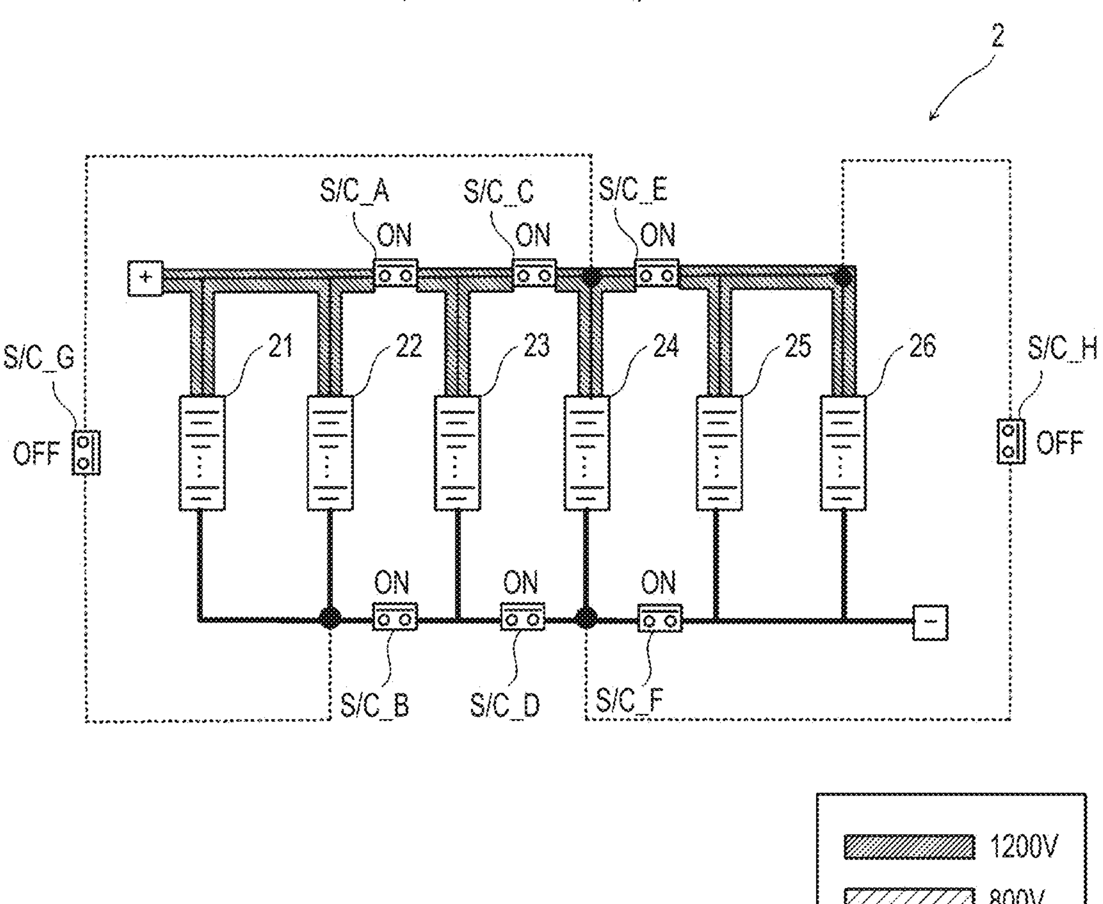
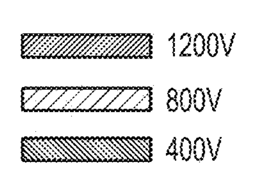

*FIG. 17*
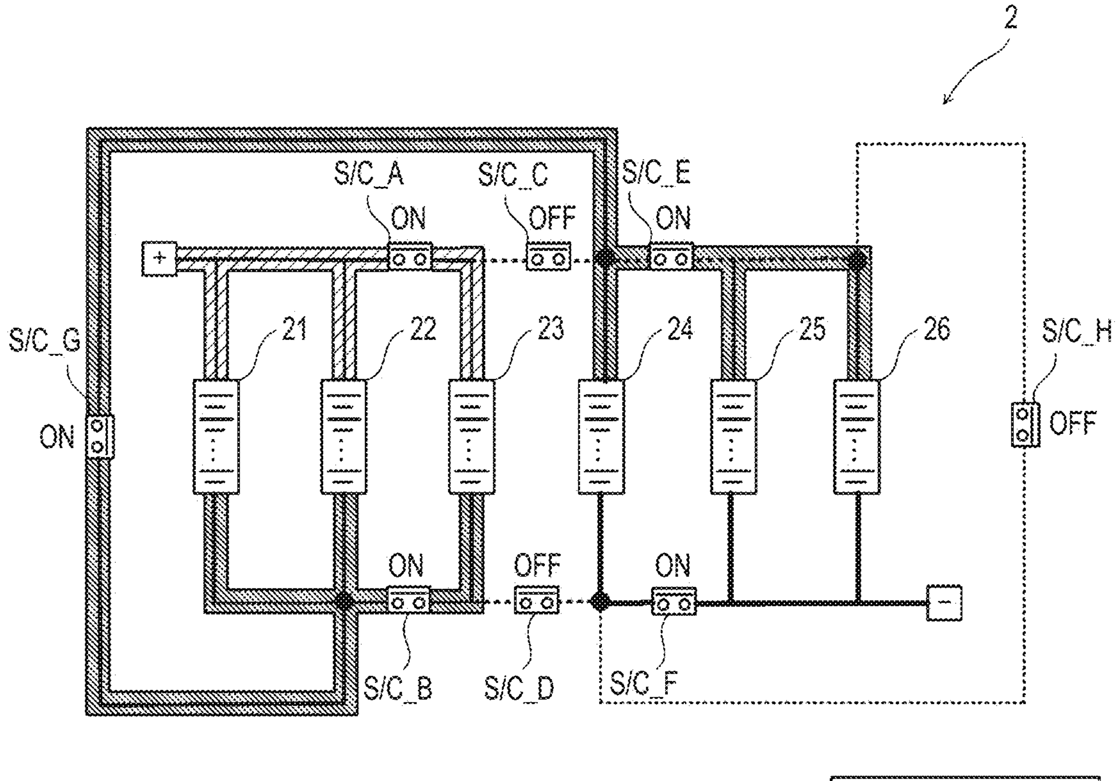
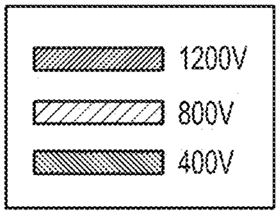

*FIG. 18*
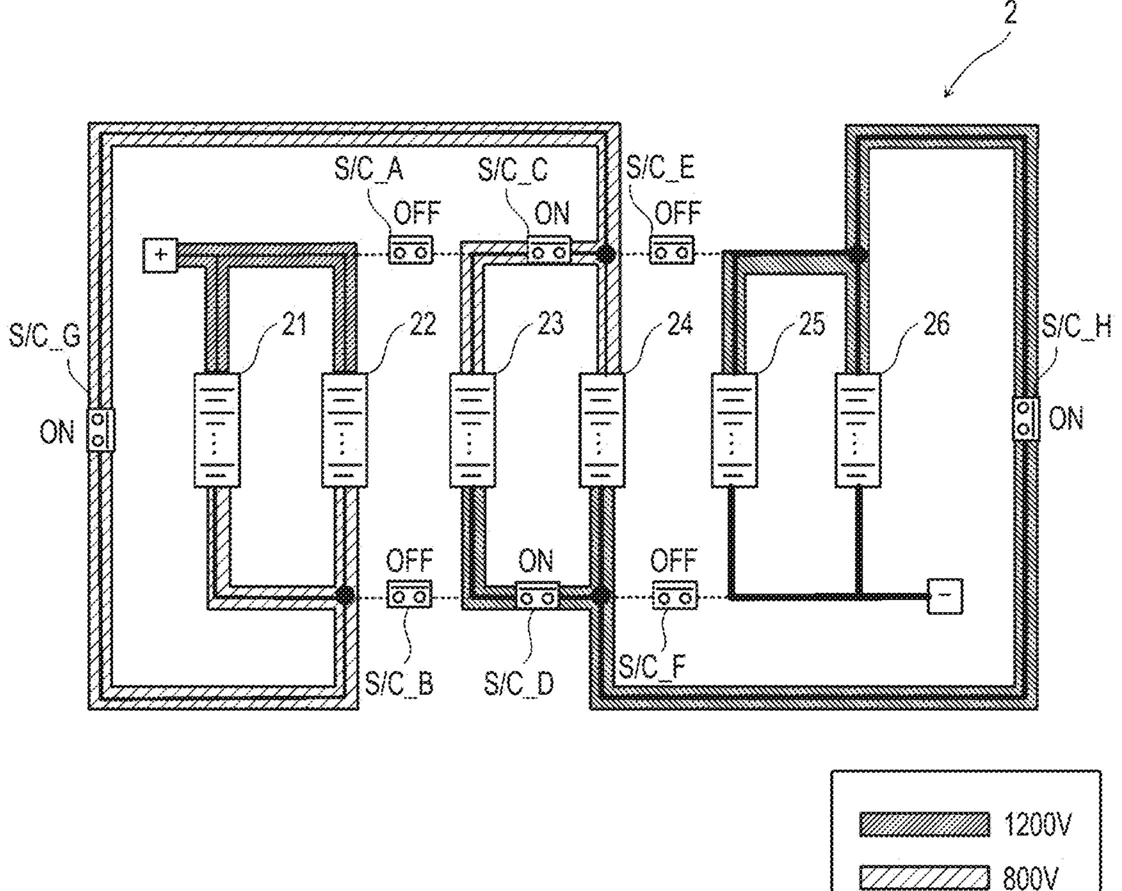
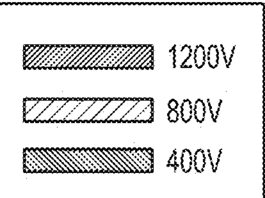

PRECHARGE CONTROL METHOD AND POWER STORAGE SYSTEM OF ELECTRIC VEHICLE

CROSS-REFERENCE TO RELATED APPLICATION

This application is based on and claims priority under 35 USC 119 from Japanese Patent Application No. 2024-019831 filed on Feb. 13, 2024.

TECHNICAL FIELD

The present invention relates to a precharge control method and a power storage system of an electric vehicle.

BACKGROUND ART

In recent years, efforts to realize a low-carbon society or a decarbonized society become active, and research and development about an electrification technique are conducted to reduce $CO_2$ emission and improve energy efficiency in vehicles.

In an electric vehicle, a capacitor is connected in parallel to a load to which DC electric power is supplied from a battery, so that electric power can be supplied stably while voltage fluctuations of the battery are reduced.

In order to prevent an extremely large inrush current from flowing instantaneously when a vehicle is started or begins to be charged, a precharge control of precharging the capacitor is performed. The precharge control generally uses a precharge circuit provided in parallel with an output switch. The precharge circuit is implemented by a series circuit of a precharge switch and a precharge resistor, and while the output switch is turned off, the precharge switch is turned on to precharge the capacitor with the precharge circuit, and then the output switch is turned on. Accordingly, an excessive charge current in an ON state of the output switch can be prevented. However, a power supply circuit through which a large current flows requires a large precharge resistor or a plurality of precharge resistors. Therefore, Patent Literature 1 discloses a method of performing precharging in two stages using a booster circuit provided with a booster (DC-DC converter).

CITATION LIST

Patent Literature 1: JP6759216B

SUMMARY OF INVENTION

In Patent Literature 1, the precharging is performed in two stages using only the booster circuit, and thus there is still room for consideration regarding electric vehicles compatible with ultra-high voltage charging.

Specifically, in an electric vehicle configured to be charged at an ultra-high voltage, in order to perform the precharging using a DC-DC converter, a large DC-DC converter having a large capacity is required, which may be disadvantageous in terms of costs, a weight, and a mounting space.

The present invention provides a precharge method and a power storage system of an electric vehicle which enable precharging using a switching mechanism inside a battery without using a booster such as a DC-DC converter or a large precharge resistor.

An aspect of the present invention relates to a precharge control method of an electric vehicle including a battery configured to be switched, by switching an internal switch, between a first voltage state capable of outputting a first voltage and a second voltage state capable of outputting a second voltage higher than the first voltage, the precharge control method including:

a first precharge step of, in a case of charging the battery at the second voltage, precharging a capacitor under a condition of the battery in the first voltage state set by switching the internal switch.

An aspect of the present invention relates to a power storage system of an electric vehicle, including:

a battery including a plurality of power storage units, and an internal switch configured to switch a connection state of the plurality of power storage units to switch between a first voltage state capable of outputting a first voltage and a second voltage state capable of outputting a second voltage higher than the first voltage;

a three-phase motor in which coils of three phases are connected at a neutral point, the three-phase motor being driven by electric power supplied from the battery;

an inverter connected on an electric power transmission path between the battery and the three-phase motor;

a DC power supply circuit connected to a first connection portion positioned on an electric power transmission path between the inverter and the battery;

a capacitor disposed between the first connection portion and the inverter; and a control unit configured to control the internal switch, in which in a case of charging the battery at the second voltage, the control unit performs a first precharge process of setting the battery to the first voltage state and precharging the capacitor.

According to the present invention, it is possible to precharge a capacitor using a switching mechanism inside a battery, without using a booster such as a DC-DC converter and a large precharge resistor.

BRIEF DESCRIPTION OF DRAWINGS

FIG. 2 is a diagram showing a second voltage state (800 V start-up) of a battery 2;

FIG. 3 is a diagram showing a first voltage state (400 V start-up) of the battery 2;

FIG. 11 is a diagram showing the first voltage state (400 V start-up) of the battery 2 according to the second embodiment;

FIG. 12 is a diagram showing the second voltage state (800 V start-up) of the battery 2 according to the second embodiment;

FIG. 13 is a diagram showing a third voltage state (1200 V start-up) of the battery 2 according to the second embodiment;

FIG. 16 is a diagram showing a first voltage state (400 V start-up) of the battery 2 according to the third embodiment;

FIG. 17 is a diagram showing a second voltage state (800 V start-up) of the battery 2 according to the third embodiment; and FIG. 18 is a diagram showing the third voltage state (1200 V start-up) of the battery 2 according to the third embodiment;

DETAILED DESCRIPTION OF THE INVENTION

Hereinafter, embodiments of the present invention will be described with reference to the drawings. First, a first embodiment of the present disclosure will be described with reference to FIGS. 1 to 9.

First Embodiment

Figure 1:
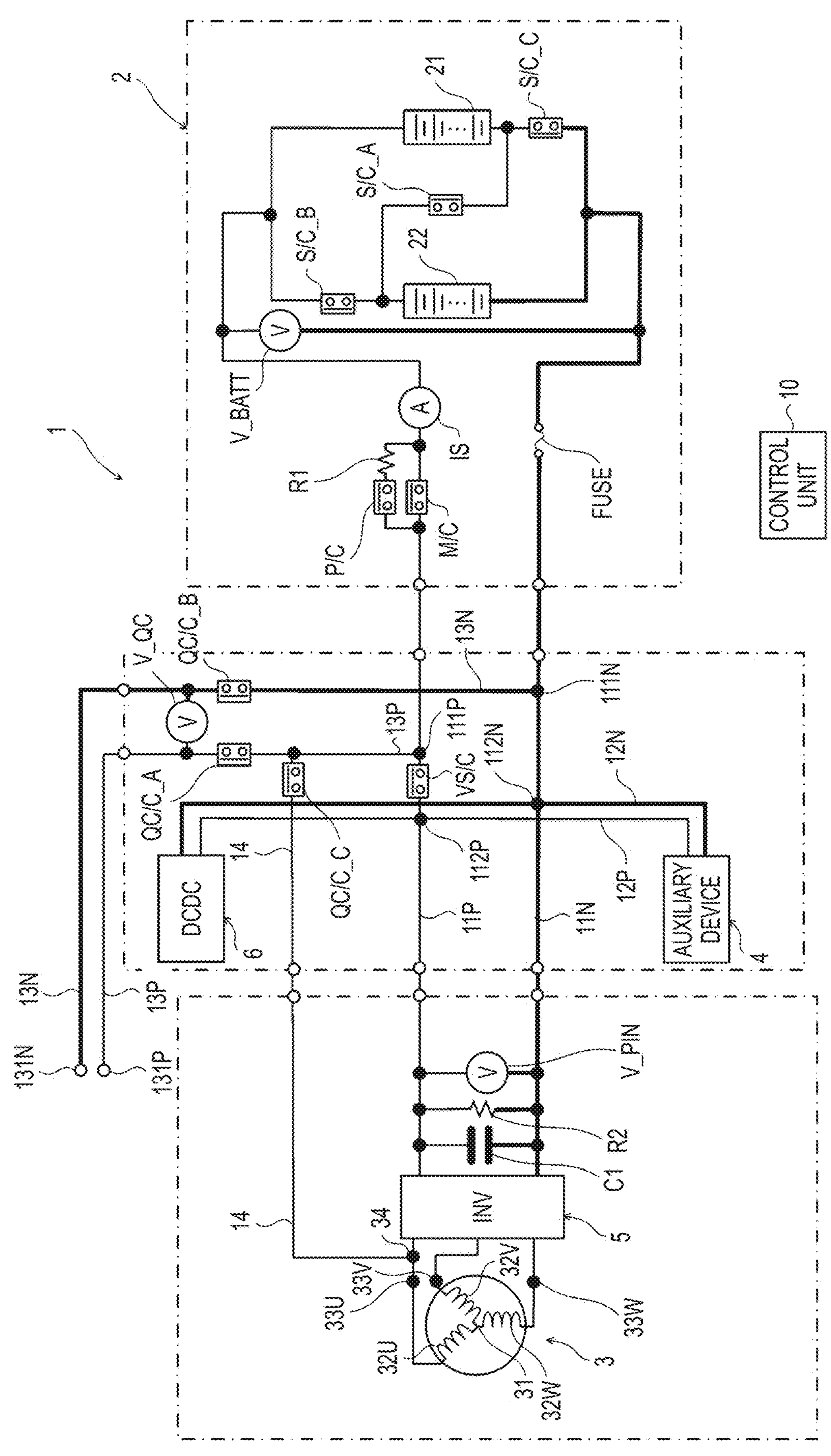
FIG. 1 is a diagram showing a configuration of a power storage system 1 according to a first embodiment.

A power storage system 1 according to the first embodiment shown in FIG. 1 is mounted on an electric vehicle. The electric vehicle including the power storage system 1 is compatible with charging equipment of 400 V class and 800 V class. The electric vehicle can not only quickly charge a battery 2 at charge voltages of 400 V and 800 V but also drive a three-phase motor 3 and an auxiliary device 4 at a base voltage of 800 V.

Specifically, as shown in FIG. 1, the power storage system 1 includes the battery 2, the three-phase motor 3, the auxiliary device 4, an inverter 5 (INV), a DC-DC converter 6, electric power supply circuits 11P and 11N, auxiliary device drive circuits 12P and 12N, DC power supply circuits 13P and 13N, a branch circuit 14, and a control unit 10.

As shown in FIGS. 1 to 3, the battery 2 includes a first power storage unit 21, a second power storage unit 22, first to fifth contactors M/C, S/C_A, S/C_B, S/C_C, P/C, a first resistor R1, a current sensor IS, a second voltage sensor V_BATT, and a current breaker FUSE.

The first power storage unit 21 and the second power storage unit 22 are battery modules which can be charged and supply power at 400 V.

The first contactor M/C is provided on a positive electrode side end of the battery 2 and functions as a main switch which turns on and off connection to the outside (the electric power supply circuit 11P) of the battery 2.

The second to fourth contactors S/C_A, S/C_B, and S/C_C switch a connection state between the first power storage unit 21 and the second power storage unit 22. For example, as shown in FIG. 2, when the second contactor S/C_A is turned on and the third contactor S/C_B and the fourth contactor S/C_C are turned off, the battery 2 is in a second voltage state (800 V start-up) in which the first power storage unit 21 and the second power storage unit 22 are connected in series, so that the battery 2 can be charged and supply power at 800 V. As shown in FIG. 3, when the second contactor S/C_A is turned off and the third contactor S/C_B and the fourth contactor S/C_C are turned on, the battery 2 is in a first voltage state (400 V start-up) in which the first power storage unit 21 and the second power storage unit 22 are connected in parallel, so that the battery 2 can be charged and supply power at 400 V. Note that the term start-up refers to a concept including driving during traveling of an electric vehicle including the power storage system 1 and charging during parking of the electric vehicle. The second to fourth contactors S/C_A, S/C_B, and S/C_C constitute an example of an internal switch configured to switch between the second voltage state (800 V start-up) and the first voltage state (400 V start-up).

The fifth contactor P/C and the first resistor R1 are arranged in series with each other and in parallel with the first contactor M/C. Note that a circuit in which the fifth contactor P/C and the first resistor R1 are provided may also be referred to as a precharge circuit. The fifth contactor P/C is turned on before the first contactor M/C is turned on, thereby protecting the first contactor M/C from an excessive inrush current.

The current sensor IS is disposed between the first contactor M/C and the power storage units 21 and 22 to measure a current.

The current breaker FUSE is provided on a negative electrode side end of the battery 2 and cuts off the connection to the outside (the electric power supply circuit 11N) of the battery 2 when an abnormality occurs. The second voltage sensor V_BATT measures a voltage of the battery 2 by connecting a positive electrode side between the first contactor M/C and the power storage units 21 and 22, and connecting a negative electrode side between the current breaker FUSE and the power storage units 21 and 22. Note that, instead of a voltage value of the second voltage sensor V_BATT, the voltage of the battery 2 may use a calculation value obtained (integrated) by the control unit 10 described later from cell voltages obtained by detecting the cell voltages of the power storage units 21 and 22. In this case, the second voltage sensor V_BATT can be omitted.

The three-phase motor 3 includes coils of three phases 32U, 32V, and 32W, one end side of each of which is connected to a neutral point 31, and is rotationally driven by electric power supplied from the battery 2 via the inverter 5. The three-phase motor 3 in the present embodiment includes a U-phase terminal 33U, a V-phase terminal 33V, and a W-phase terminal 33W connected to the other end side of each of the coils 32U, 32V, and 32W, respectively. The U-phase terminal 33U, the V-phase terminal 33V, and the W-phase terminal 33W are connected to the inverter 5. The other end side of a coil of any one phase among the coils 32U, 32V, and 32W is connected to the branch circuit 14 at a connection portion 34. In the present embodiment, the coil 32U among the coils of three phases 32U, 32V, and 32W is connected to the branch circuit 14 at the connection portion 34 positioned between the U-phase terminal 33U and the inverter 5.

The inverter 5 converts DC electric power supplied from the battery 2 into three-phase AC electric power by switching a plurality of switching elements, so as to rotationally drive the three-phase motor 3. When a DC (400 V) is supplied from the branch circuit 14 to the connection portion 34, the inverter 5 can function as a booster circuit by switching the plurality of switching elements to boost the DC (to 800 V) using the coils 32U, 32V, and 32W. That is, the coils 32U, 32V, and 32W wound around a stator core are used as transformers. The inverter 5 allows a current to flow from the three-phase motor 3 side to the battery 2 side regardless of ON and OFF states of a gate, and allows a current to flow from the battery 2 side to the three-phase motor 3 side only when the gate is in an ON state.

The auxiliary device 4 is a high-voltage driven in-vehicle device which can be driven by DC electric power from the battery 2 and an external power supply, and examples thereof include an electric compressor or a heater for air-conditioning. The auxiliary device 4 is connected to the battery 2 via the auxiliary device drive circuits 12P and 12N, a seventh contactor VS/C, and the electric power supply circuits 11P and 11N, which will be described later. The auxiliary device 4 according to the present embodiment is operated at the base voltage of 800 V.

The DC-DC converter 6 steps down the DC electric power from the battery 2 and the external power supply to drive a low-voltage driven in-vehicle device.

The electric power supply circuits 11P and 11N are configured as a positive and negative pair and connect the battery 2 and the inverter 5 (three-phase motor 3). The electric power supply circuits 11P and 11N are provided with connection portions 111P and 111N connected to the DC power supply circuits 13P and 13N, and are provided with connection portions 112P and 112N connected to the auxiliary device drive circuits 12P and 12N (auxiliary device 4) on a side closer to the inverter 5 than the connection portions 111P and 111N. The electric power supply circuit 11P at the positive electrode side is provided with the seventh contactor VS/C which turns on and off the circuit between the connection portion 112P connected to the auxiliary device drive circuit 12P and the connection portion 111P connected to the DC power supply circuit 13P. A first voltage sensor V_PIN, a first smoothing capacitor C1, and a second resistor R2 are provided on the inverter 5 side of the electric power supply circuits 11P and 11N. The first voltage sensor V_PIN, the first smoothing capacitor C1, and the second resistor R2 are provided on a circuit that connects the electric power supply circuit 11P at the positive electrode side and the electric power supply circuit 11N at the negative electrode side. Note that the second resistor R2 is provided to discharge the first smoothing capacitor C1 when the circuit is cut off.

The DC power supply circuits 13P and 13N are configured as a positive and negative pair and include one end provided with charge terminals 131P and 131N to which an external power supply such as charging equipment can be connected and the other end connected to the electric power supply circuits 11P and 11N via the connection portions 111P and 111N. The DC power supply circuits 13P and 13N are provided with an eighth contactor QC/C_A and a ninth contactor QC/C_B for turning on and off the circuits, respectively. A third voltage sensor V_QC is provided at a position closer to the charge terminals 131P and 131N than the eighth contactor QC/C_A and the ninth contactor QC/C_B.

The branch circuit 14 is branched, in the DC power supply circuit 13P at the positive electrode side, at a position closer to the connection portion 111P than the eighth contactor QC/C_A and is connected to one of the coils of the three-phase motor 3 via the connection portion 34. An intermediate portion of the branch circuit 14 is provided with a tenth contactor QC/C_C for turning on and off the circuit.

The control unit 10 is, for example, a vehicle ECU and controls driving and charging of the power storage system 1. More specifically, the control unit 10 performs ON/OFF control of the contactors M/C, S/C_A, S/C_B, S/C_C, P/C, VS/C, QC/C_A, QC/C_B, and QC/C_C, and control of the DC-DC converter 6 and the inverter 5. The control unit 10 executes a precharge control to precharge the first smoothing capacitor C1 during the traveling of the electric vehicle (800 V driving), during charging at the second voltage (800 V charging), and during charging at the first voltage (400 V charging). The precharge control will be described in detail later.

Next, an operation of the power storage system 1 will be described with reference to FIGS. 4 to 6.

Figure 4:
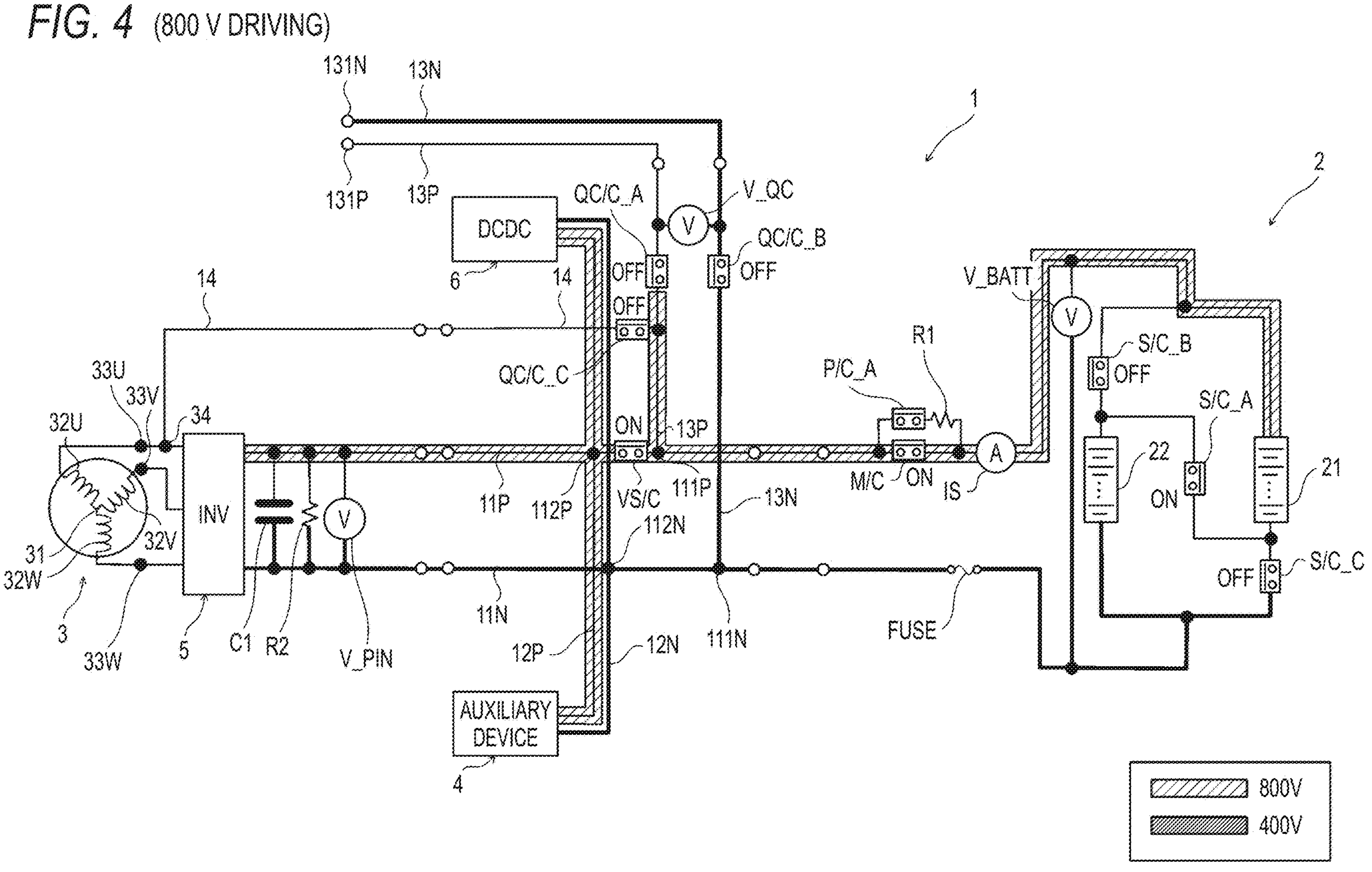
FIG. 4 is a diagram showing a flow of a current during traveling (800 V driving) of an electric vehicle including the power storage system 1 according to the first embodiment.

FIG. 4 is a diagram showing a flow of a current during the traveling (800 V traveling) of the electric vehicle including the power storage system 1 according to the first embodiment.

As described above, the electric vehicle including the power storage system 1 drives the three-phase motor 3 and the auxiliary device 4 at the base voltage of 800 V, and the battery 2 is controlled to the second voltage state (800 V start-up) shown in FIG. 2 during the traveling. The control unit 10 also turns on the first contactor M/C and the seventh contactor VS/C, and turns off the eighth contactor QC/C_A, the ninth contactor QC/C_B, and the tenth contactor QC/C_C. The fifth contactor P/C is controlled to be in the ON state only during a single-stage precharge process and a first precharge step of a two-stage precharge process of the precharge control described later, and is otherwise controlled to be in the OFF state.

In this mode, a voltage of 800 V is supplied from the battery 2 to the three-phase motor 3 via the inverter 5, enabling the electric vehicle to travel. In this case, the auxiliary device 4 is driven by a voltage of 800 V supplied from the battery 2 via the electric power supply circuits 11P and 11N and the auxiliary device drive circuits 12P and 12N.

Figure 5:
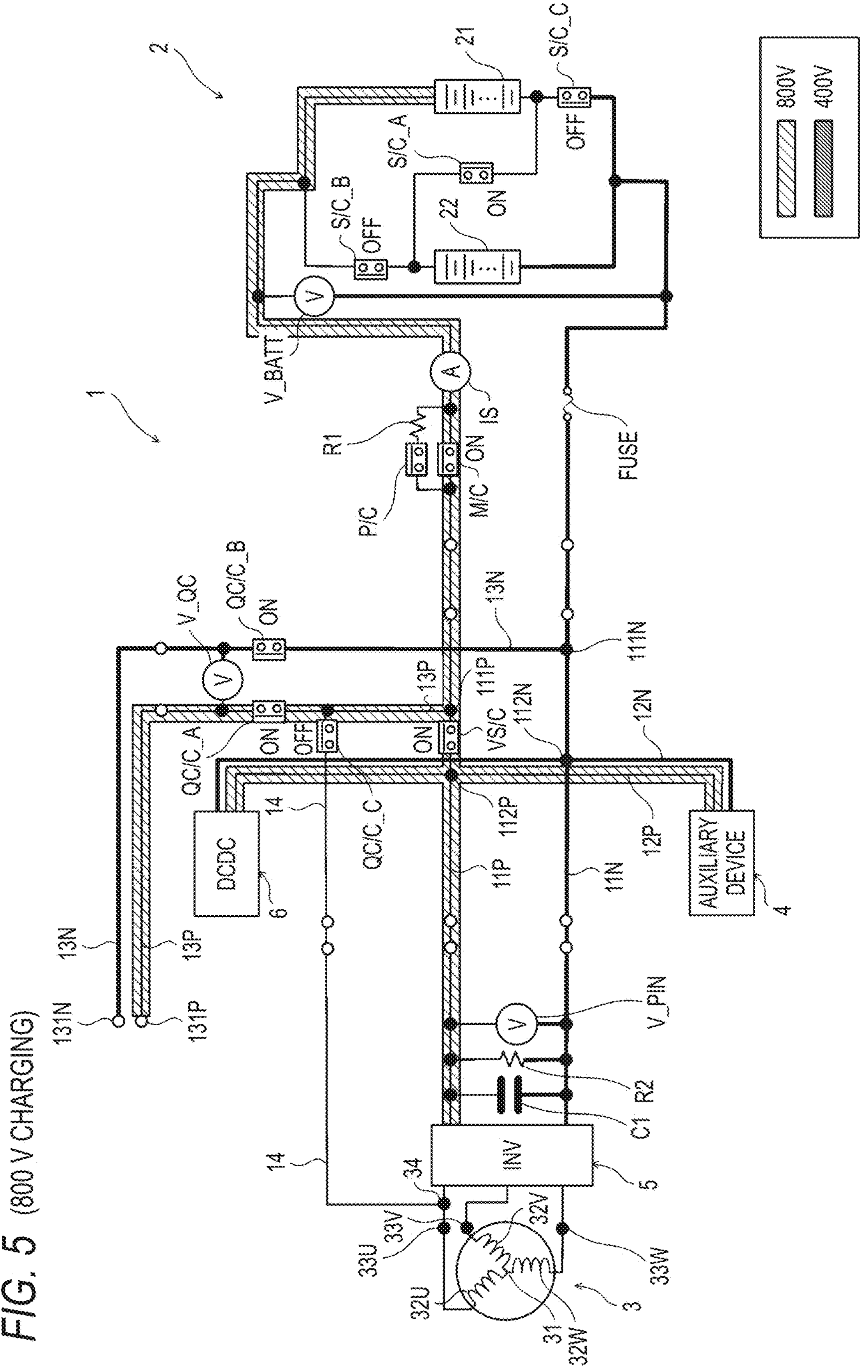
FIG. 5 is a diagram showing a flow of a current during charging at a second voltage (800 V charging) of the electric vehicle including the power storage system 1 according to the first embodiment.

FIG. 5 is a diagram showing a flow of a current during charging at the second voltage (800 V charging) of the electric vehicle including the power storage system 1 according to the first embodiment.

When charging with the charging equipment of 800 V class, the battery 2 is controlled to an 800 V start-up state shown in FIG. 2. The control unit 10 turns on the first contactor M/C, the seventh contactor VS/C, the eighth contactor QC/C_A, and the ninth contactor QC/C_B, and turns off the tenth contactor QC/C_C. As a result, a voltage of 800 V is supplied from the charge terminals 131P and 131N to the battery 2, and a voltage of 800 V is supplied to the auxiliary device 4 via the electric power supply circuit 11P and the auxiliary device drive circuit 12P.

Figure 6:
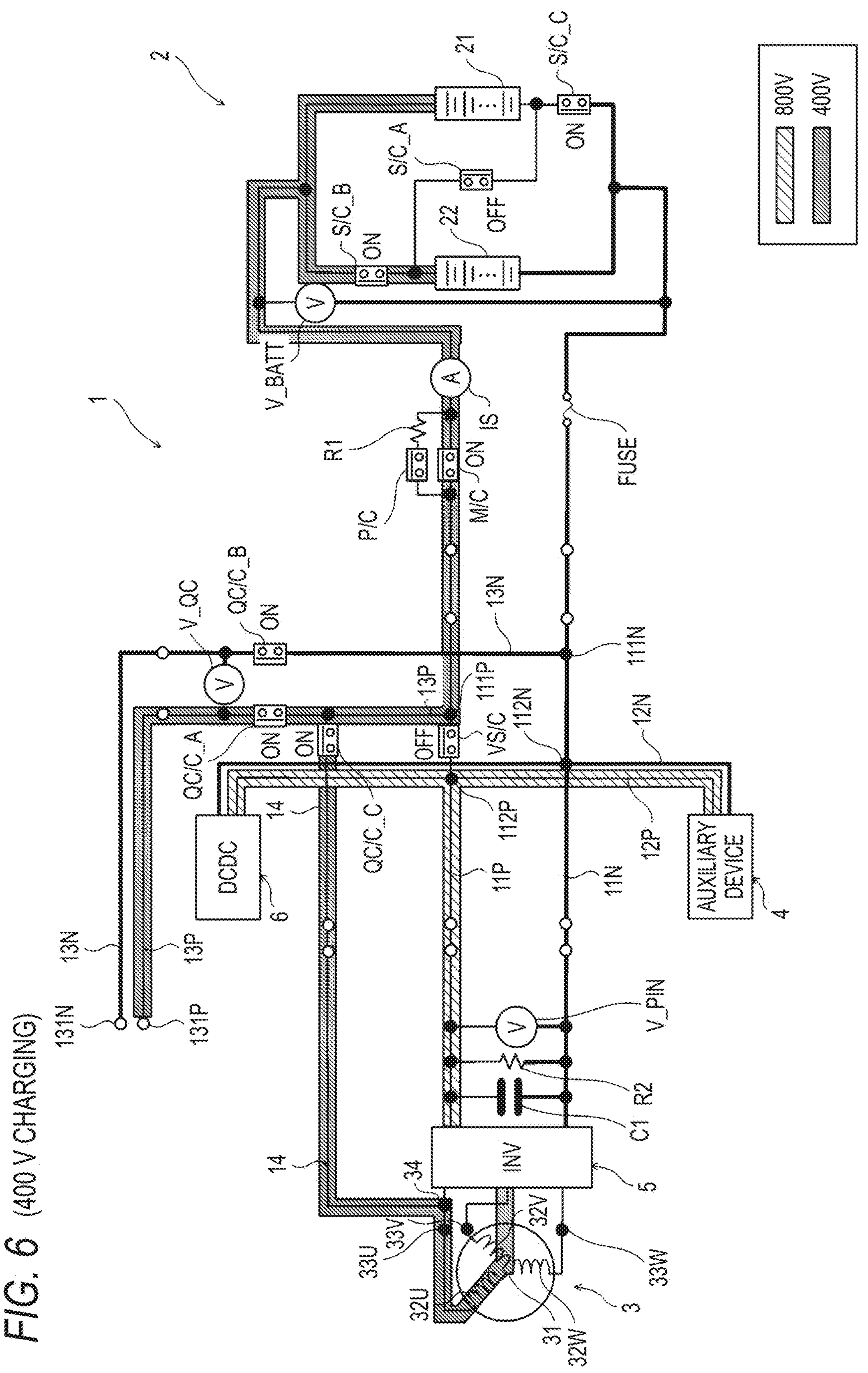
FIG. 6 is a diagram showing a flow of a current during charging at the first voltage (400 V charging) of the electric vehicle including the power storage system 1 according to the first embodiment.

FIG. 6 is a diagram showing a flow of a current during charging at the first voltage (400 V charging) of the electric vehicle including the power storage system 1 according to the first embodiment.

When charging with the charging equipment of 400 V class, the battery 2 is controlled to a 400 V start-up state shown in FIG. 3. The control unit 10 turns on the first contactor M/C the eighth contactor QC/C_A, the ninth contactor QC/C_B, and the tenth contactor QC/C_C, and turns off the seventh contactor VS/C. As a result, a voltage of 400 V is supplied from the charge terminals 131P and 131N to the battery 2, and a voltage of 400 V is supplied via the branch circuit 14 to the coil 32U.

Here, in order to drive the auxiliary device 4 having a base voltage of 800 V, it is necessary to boost the voltage of 400 V to 800 V, which is the base voltage of the auxiliary device 4. Therefore, the control unit 10 performs a boost operation by a switching operation of the inverter 5. Accordingly, the three-phase motor 3 and the inverter 5 connected to the DC power supply circuits 13P and 13N via the branch circuit 14 boost the first voltage (400 V) supplied from the charging equipment to the second voltage (800 V) to drive the auxiliary device 4.

Next, a precharge control procedure of the first smoothing capacitor C1 performed by the power storage system 1 according to the first embodiment will be described with reference to FIGS. 7 to 9. The first smoothing capacitor C1 is first precharged during the traveling of the electric vehicle (800 V driving), during charging at the second voltage (800 V charging), and during charging at the first voltage (400 V charging) described above.

Figure 7:
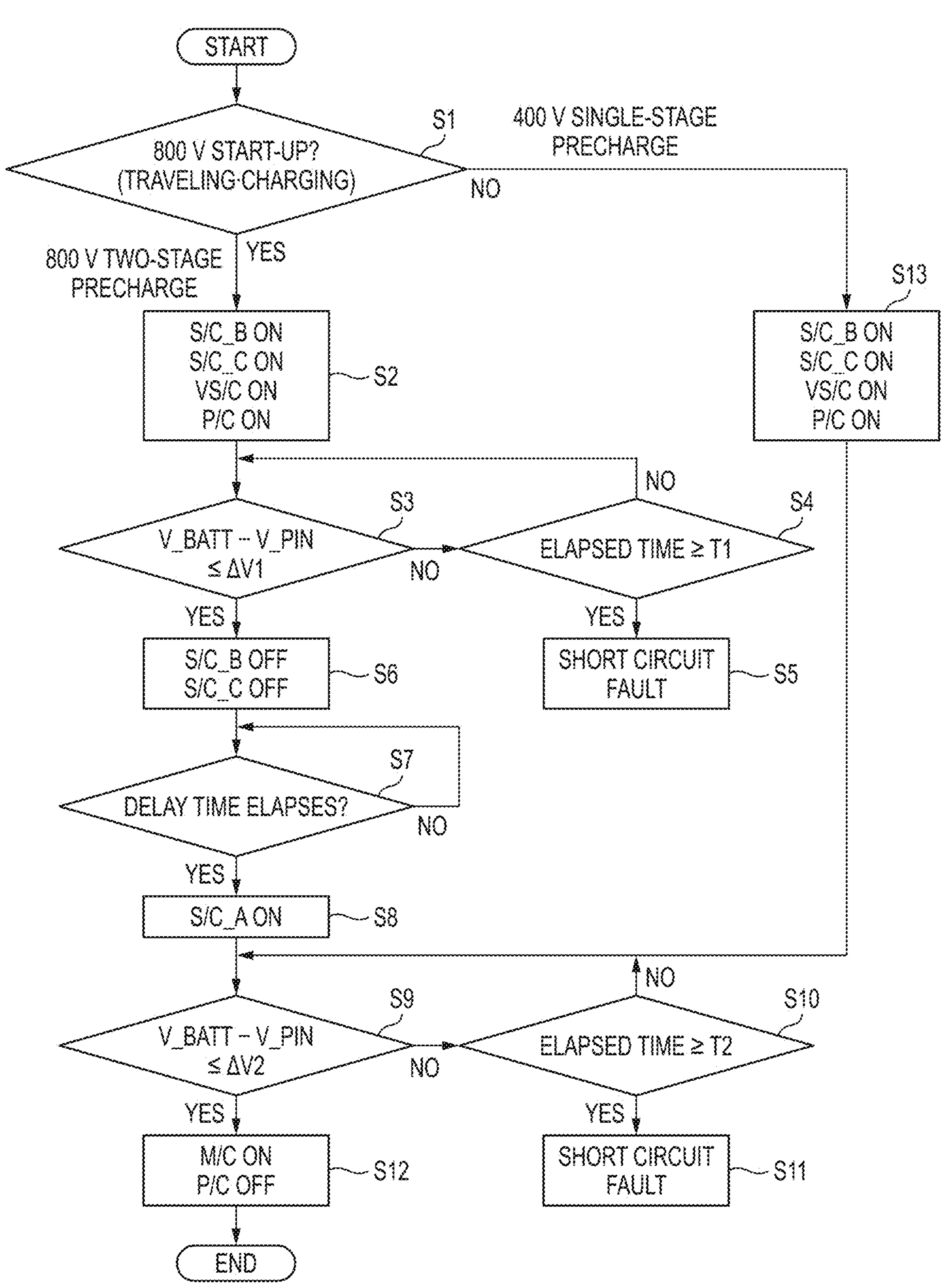
FIG. 7 is a flowchart showing a precharge control procedure of the electric vehicle including the power storage system 1 according to the first embodiment.
Figure 8:
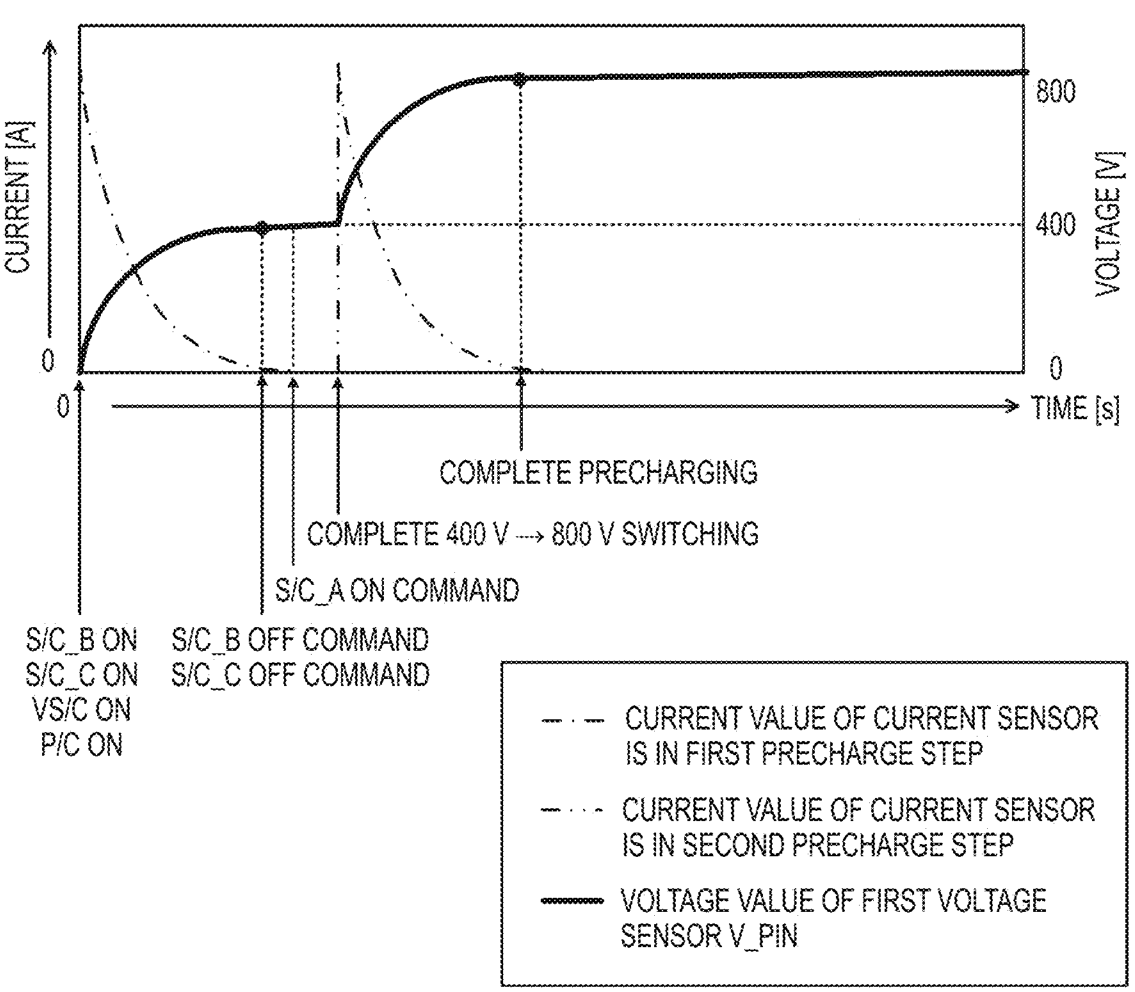
FIG. 8 is a graph showing a current and a voltage in a two-stage precharge process of the electric vehicle including the power storage system 1 according to the first embodiment.

FIG. 7 is a flowchart showing the precharge control procedure of the electric vehicle including the power storage system 1 according to the first embodiment, and FIG. 8 is a graph showing a current and a voltage in the two-stage precharge process.

As shown in FIG. 7, when the system is started by turning on an ignition switch or connecting a charging plug, the control unit 10 first determines whether the start-up is in the second voltage state (800 V traveling or 800 V charging) (S1), and if a determination result is YES, the two-stage precharge process (S2 to S12) is executed, and if the determination result is NO, the single-stage precharge process (S13 and S9 to S12) is executed. The single-stage precharge process is a normal precharge process that utilizes a precharge circuit, and is used to be distinguished from the two-stage precharge process.

In a case where the control unit 10 performs the single-stage precharge process (step S1: NO), the control unit 10 turns on the third contactor S/C_B and the fourth contactor S/C_C while keeping the second contactor S/C_A in the OFF state to set the battery 2 to the 400 V start-up state shown in FIG. 3, and turns on the fifth contactor P/C and the seventh contactor VS/C while keeping the first contactor M/C in the OFF state (S13). Accordingly, the current from the battery 2 in the first voltage state (400 V) is supplied to the first smoothing capacitor C1 through the first resistor R1. Accordingly, the first smoothing capacitor C1 can be precharged while preventing the inrush current.

Thereafter, the control unit 10 determines whether a difference between a detected voltage of the second voltage sensor V_BATT and a detected voltage of the first voltage sensor V_PIN is equal to or less than a second threshold ΔV2 (S9), and determines whether an elapsed time is equal to or greater than a second timer time T2 (S10). If the second timer time T2 elapses before the determination result of step S9 becomes YES (step S10: YES), the control unit 10 determines that a short circuit fault occurs and issues an abnormality notification (S11). If the determination result of step S9 becomes YES before the second timer time T2 elapses, the control unit 10 determines that the single-stage precharge in the first voltage state (400 V) is ended, and turns on the first contactor M/C and turns off the fifth contactor P/C OFF (S12). Accordingly, the transition to 400 V charging is possible.

In a case where the control unit 10 performs the two-stage precharge process (step S1: YES), the control unit 10 turns on the third contactor S/C_B and the fourth contactor S/C_C while keeping the second contactor S/C_A in the OFF state to set the battery 2 to the 400 V start-up state shown in FIG. 3, and turns on the fifth contactor P/C and the seventh contactor VS/C while keeping the first contactor M/C in the OFF state (S2). Accordingly, a first stage precharge (first precharge step) of the first smoothing capacitor C1 is started, and a current from the battery 2 in the first voltage state (400 V) is supplied to the first smoothing capacitor C1 through the first resistor R1. Accordingly, the first voltage sensor V_PIN rises to about 400 V as shown in FIG. 8.

Thereafter, the control unit 10 determines whether the difference between the detected voltage of the second voltage sensor V_BATT and the detected voltage of the first voltage sensor V_PIN is equal to or less than a first threshold ΔV1 (S3), and determines whether the elapsed time is equal to or greater than a first timer time T1 (S4). If the first timer time T1 elapses before the determination result of step S3 becomes YES (step S4: YES), the control unit 10 determines that a short circuit fault occurs and issues an abnormality notification (S5).

If the determination result in step S3 becomes YES before the first timer time T1 elapses, in other words, if the voltage of the first smoothing capacitor C1 becomes a voltage equivalent to the first voltage (400 V), the control unit 10 determines that the first stage precharge in the first voltage state (400 V) is ended, and turns off the third contactor S/C_B and the fourth contactor S/C_C (S6).

Next, after a predetermined delay time elapses (S7), the control unit 10 turns on the second contactor S/C_A (S8) and sets the battery 2 to the second voltage state (800 V) shown in FIG. 2. Accordingly, a second stage precharge (second precharge step) of the first smoothing capacitor C1 is started, and a current from the battery 2 in the second voltage state (800 V) is supplied to the first smoothing capacitor C1 through the first resistor R1. Accordingly, the first voltage sensor V_PIN rises from 400 V to about 800 V as shown in FIG. 8.

Thereafter, the control unit 10 determines whether a difference between a detected voltage of the second voltage sensor V_BATT and a detected voltage of the first voltage sensor V_PIN is equal to or less than a second threshold ΔV2 (S9), and determines whether an elapsed time is equal to or greater than a second timer time T2 (S10). If the second timer time T2 elapses before the determination result of step S9 becomes YES (step S10: YES), the control unit 10 determines that a short circuit fault occurs and issues an abnormality notification (S11). If the determination result in step S9 becomes YES before the second timer time T2 elapses, in other words, if the voltage of the first smoothing capacitor C1 becomes a voltage equivalent to the second voltage (800 V), the control unit 10 determines that the second stage precharge in the second voltage state (800 V) is ended, turns on the first contactor M/C, and turns off the fifth contactor P/C (S12). Accordingly, the transition to 800 V traveling or 800 V charging is possible.

In the above example, the single-stage precharge process is executed at the start-up (400 V charging) in the first voltage state (400 V) and the two-stage precharge process is executed at the start-up (800 V traveling or 800 V charging) in the second voltage state (800 V), but generally, the single-stage precharge process can also be executed at the start-up (800 V traveling or 800 V charging) in the second voltage state (800 V). Specifically, when applied to the power storage system 1 according to the first embodiment, the second contactor S/C_A is turned on while the third contactor S/C_B and the fourth contactor S/C_C are kept in the OFF state to set to the 800 V start-up state shown in FIG.

2, and the fifth contactor P/C and the seventh contactor VS/C are turned on while the first contactor M/C is kept in the OFF state. Accordingly, the current from the battery 2 in the second voltage state (800 V) is supplied to the first smoothing capacitor C1 through the first resistor R1, and thus the first smoothing capacitor C1 can be precharged while the inrush current is prevented.

However, in this case, the first resistor R1 needs to be a large precharge resistor capable of withstanding the current from the battery 2 in the second voltage state (800 V). On the other hand, according to the two-stage precharge process described above, when the first smoothing capacitor C1 is precharged to the second voltage (800 V), the connection state of the battery 2 is switched to set the battery 2 to the first voltage state (400 V) to perform the first stage precharge (first precharge step), and then the battery 2 is set to the second voltage state (800 V) to perform the second stage precharge (second precharge step), and thus, a voltage difference (maximum 400 V) between the battery 2 and the first smoothing capacitor C1 can be prevented, compared to a case where the battery 2 is set to the second voltage state (800 V) from the beginning to perform the single-stage precharge. That is, even in a case where the voltage of the first smoothing capacitor C1 is precharged to 800 V, by increasing the voltage in steps of 400 V each time, the current flowing through the first resistor R1 becomes equivalent to that in a case where the first smoothing capacitor C1 is precharged to the first voltage (400 V).

Figure 9:
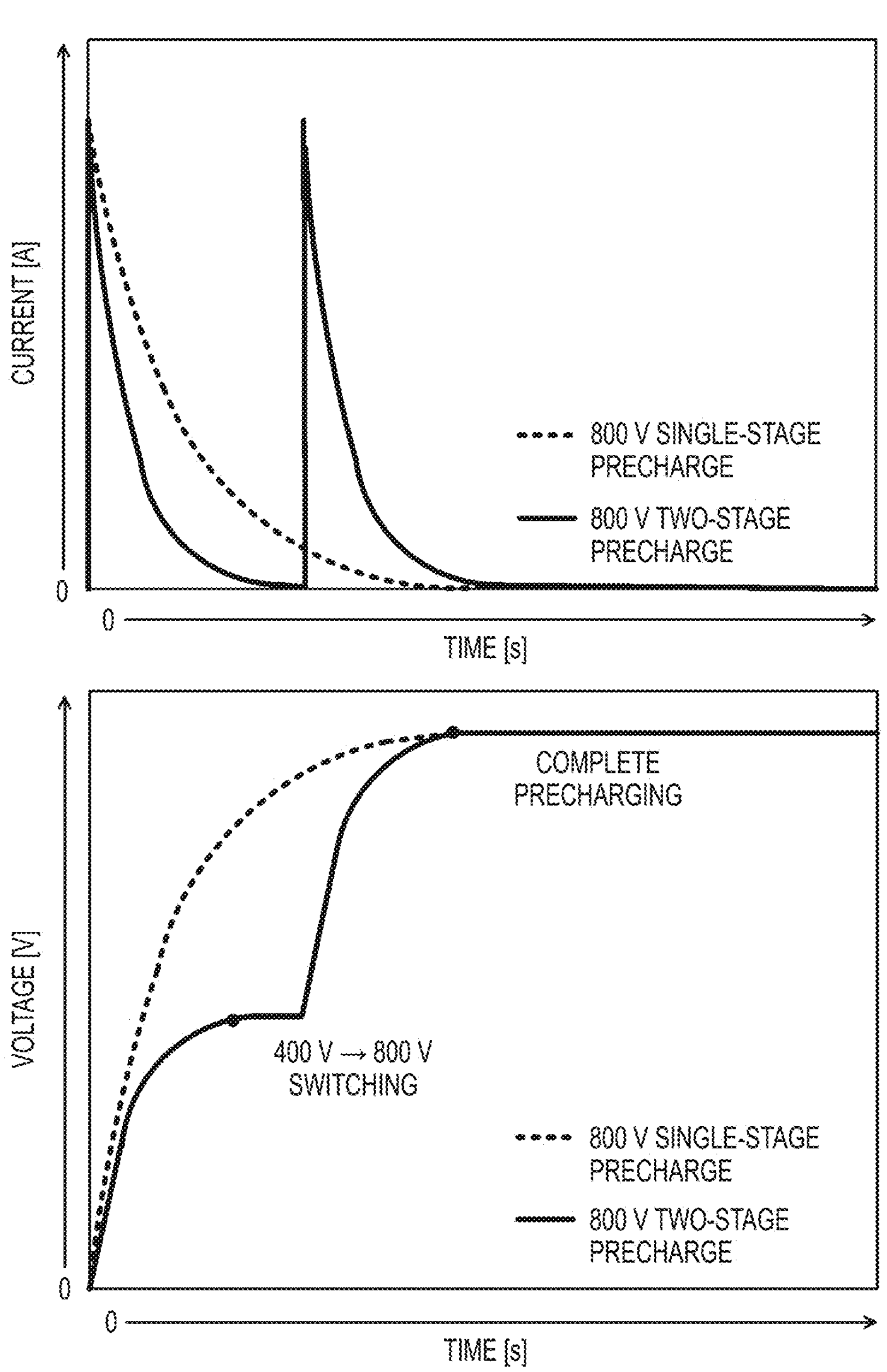
FIG. 9 is a diagram comparing the two-stage precharge process (800 V) and a single-stage precharge process (800 V) of the electric vehicle including the power storage system 1 according to the first embodiment.
Figure 10:
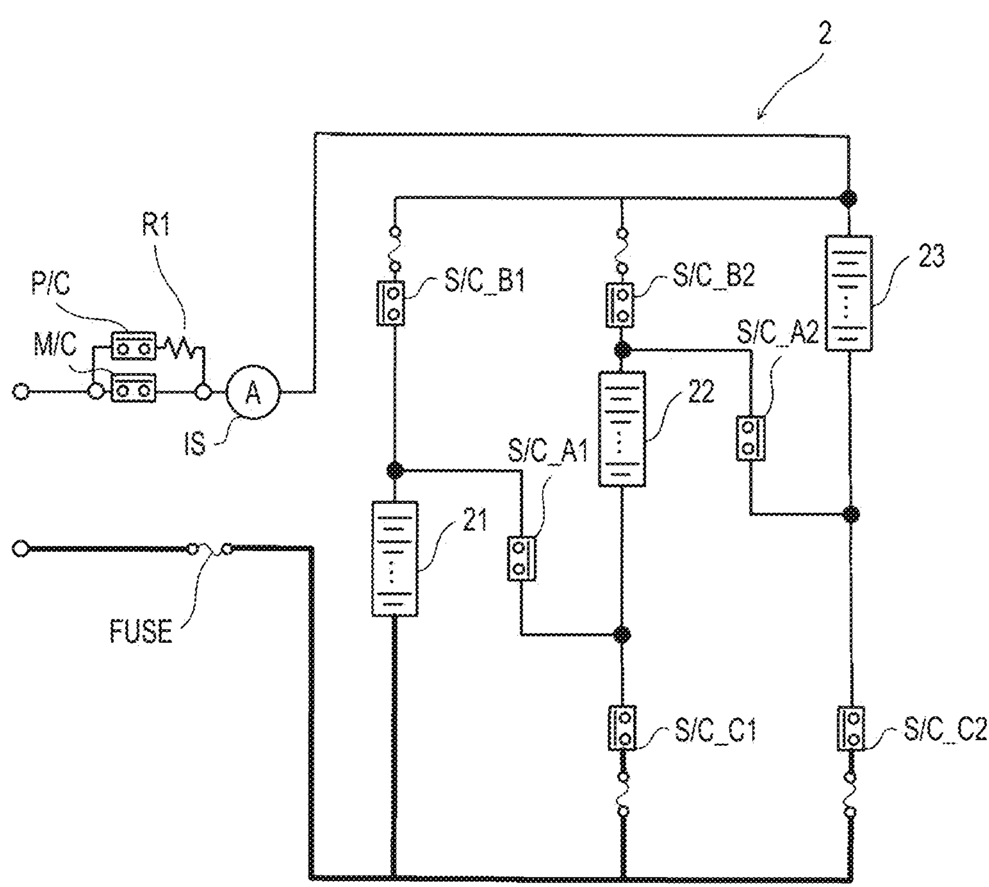
FIG. 10 is a diagram showing a configuration of the power storage system 1 according to a second embodiment.

FIG. 9 is a diagram comparing the two-stage precharge process (800 V) and the single-stage precharge process (800 V) of the electric vehicle including the power storage system 1 according to the first embodiment.

As shown in FIG. 9, in order to set the single-stage precharge and the two-stage precharge in the second voltage state (800 V) to be completed at the same time, the first resistor R1 in the single-stage precharge in the second voltage state (800 V) needs to be set to a resistance value twice that of the first resistor R1 in the single-stage precharge in the first voltage state (400 V). Accordingly, according to the present embodiment, the first smoothing capacitor C1 can be precharged without using a large precharge resistor or a high-output booster, and the first smoothing capacitor C1 can be precharged at a low cost.

Second Embodiment

Next, the power storage system 1 according to a second embodiment will be described with reference to FIGS. 10 to 14. Here, the same reference numerals as in the first embodiment are used for the same configurations as in the first embodiment, and the description of the first embodiment may be incorporated.

The first embodiment described above shows the power storage system 1 of the electric vehicle which includes the battery 2 configured to be switched between the first voltage state (400 V) and the second voltage state (800 V) by switching the connection state of the battery 2, and is capable of traveling and charging in the second voltage state (800 V) and charging in the first voltage state (400 V). However, the power storage system 1 of the electric vehicle according to the second embodiment includes the battery 2 configured to be switched between the first voltage state (400 V), the second voltage state (800 V), and a third voltage state (1200 V) by switching the internal switch, and is configured to travel and charge in the third voltage state (1200 V) and charge in the first voltage state (400 V). Note that the charging in the second embodiment may be possible only in the third voltage state (1200 V), and may not be possible in the first voltage state (400 V).

Specifically, the battery 2 according to the second embodiment includes the first power storage unit 21, the second power storage unit 22, a third power storage unit 23, the first contactor M/C, a second-1 contactor S/C_A1, a second-2 contactor S/C_A2, a third-1 contactor S/C_B1, a third-2 contactor S/C_B2, a fourth-1 contactor S/C_C1, a fourth-2 contactor S/C_C2, the fifth contactor P/C, the first resistor R1, the current sensor IS, and the current breaker FUSE.

The first power storage unit 21, the second power storage unit 22, and the third power storage unit 23 are battery modules which can be charged and supply power at 400 V.

The second-1 contactor S/C_A1, the second-2 contactor S/C_A2, the third-1 contactor S/C_B1, the third-2 contactor S/C_B2, the fourth-1 contactor S/C_C1, and the fourth-2 contactor S/C_C2 constitute an example of the internal switch, and switch the connection states of the first power storage unit 21, the second power storage unit 22, and the third power storage unit 23.

For example, as shown in FIG. 11, when the second-1 contactor S/C_A1 is turned off, the second-2 contactor S/C_A2 is turned off, the third-1 contactor S/C_B1 is turned on, the third-2 contactor S/C_B2 is turned off, the fourth-1 contactor S/C_C1 is turned off, and the fourth-2 contactor S/C_C2 is turned off, the battery 2 becomes the first voltage state (400 V) in which only the first power storage unit 21 is connected. This first voltage state (400 V) is used for a first stage precharge of a three-stage precharge process described later.

In a case of charging in the first voltage state (400 V), the second-1 contactor S/C_A1 is turned off, the second-2 contactor S/C_A2 is turned off, the third-1 contactor S/C_B1 is turned on, the third-2 contactor S/C_B2 is turned on, the fourth-1 contactor S/C_C1 is turned on, and the fourth-2 contactor S/C_C2 is turned on. Accordingly, the battery 2 becomes the first voltage state (400 V) in which the first power storage unit 21, the second power storage unit 22, and the third power storage unit 23 are connected in parallel, and can perform the charging in the first voltage state (400 V).

For example, as shown in FIG. 12, when the second-1 contactor S/C_A1 is turned on, the second-2 contactor S/C_A2 is turned off, the third-1 contactor S/C_B1 is turned off, the third-2 contactor S/C_B2 is turned on, the fourth-1 contactor S/C_C1 is turned off, and the fourth-2 contactor S/C_C2 is turned off, the battery 2 becomes the second voltage state (800 V) in which the first power storage unit 21 and the second power storage unit 22 are connected in series. This second voltage state (800 V) is used for a second stage precharge of the three-stage precharge process.

As shown in FIG. 13, when the second-1 contactor S/C_A1 is turned on, the second-2 contactor S/C_A2 is turned on, the third-1 contactor S/C_B1 is turned off, the third-2 contactor S/C_B2 is turned off, the fourth-1 contactor S/C_C1 is turned off, and the fourth-2 contactor S/C_C2 is turned off, the battery 2 becomes the third voltage state (1200 V) in which the first power storage unit 21, the second power storage unit 22, and the third power storage unit 23 are connected in series, and the battery is not only used for traveling and charging in the third voltage state (1200 V), but also for a third stage precharge of the three-stage precharge process.

In the power storage system 1 according to the second embodiment, when traveling and charging in the third voltage state (1200 V), the first smoothing capacitor C1 is precharged by the three-stage precharge process. Specifically, in a case of traveling or charging in the third voltage state (1200 V), the control unit 10 first sets the battery 2 to the first voltage state (400 V) and performs the first stage precharge (first precharge step) of the first smoothing capacitor C1, and after the first stage precharge is completed, sets the battery 2 to the second voltage state (800 V) and performs the second stage precharge (second precharge step) of the first smoothing capacitor C1, and further, after the second stage precharge is completed, sets the battery 2 to the third voltage state (1200 V), and performs the third stage precharge (third precharge step) of the first smoothing capacitor C1.

Figure 14:
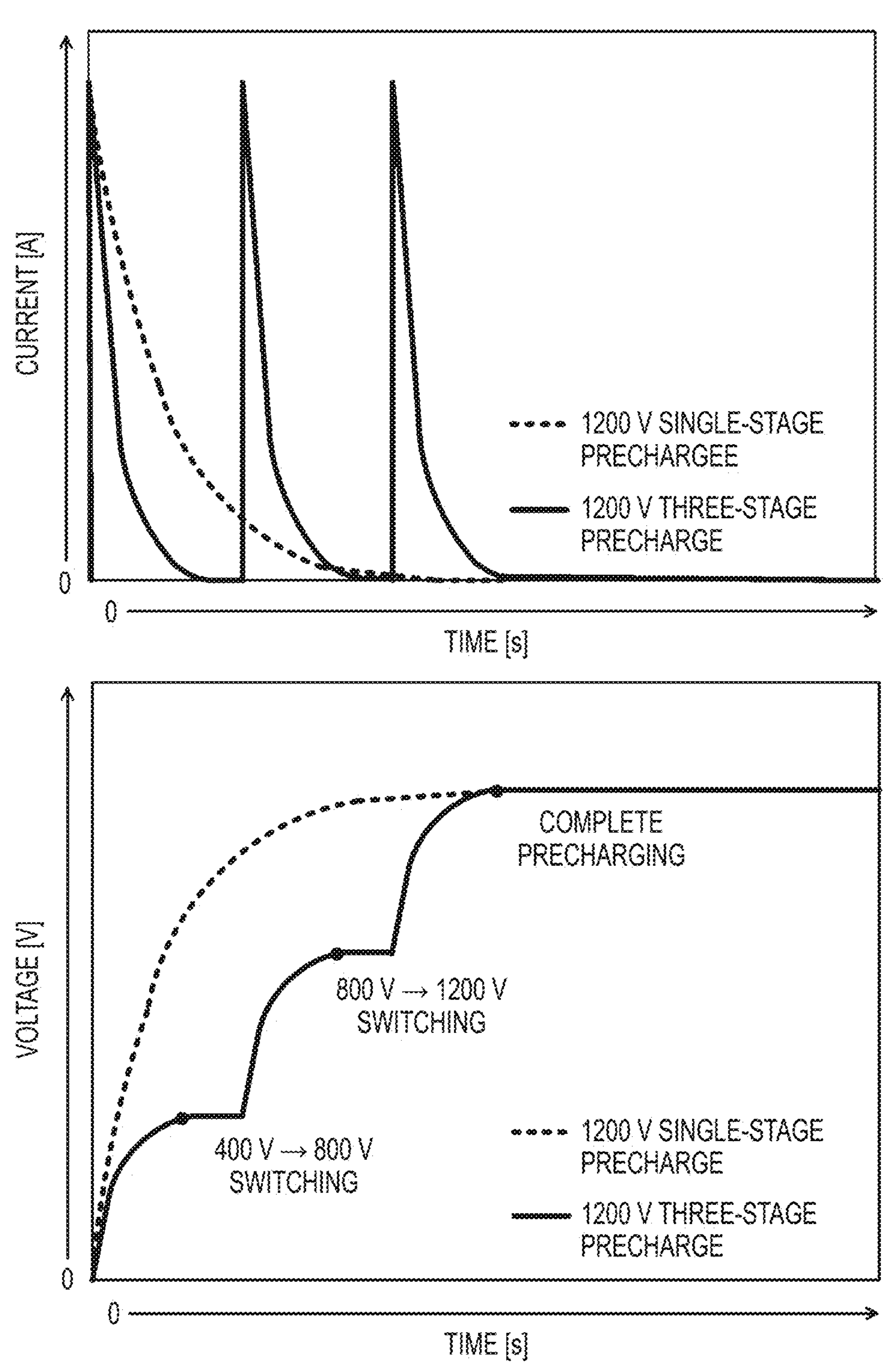
FIG. 14 is a diagram comparing a three-stage precharge process (1200 V) and a single-stage precharge process (1200 V) of the electric vehicle including the power storage system 1 according to the second embodiment.
Figure 15:
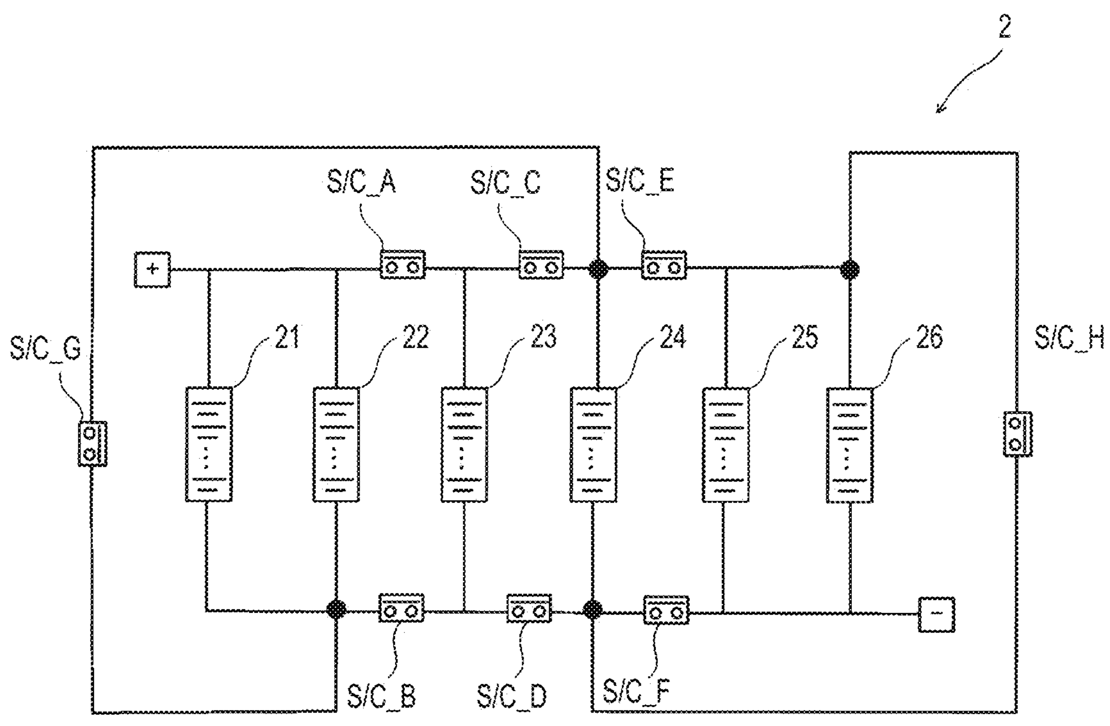
FIG. 15 is a diagram showing a configuration of the power storage system 1 according to a third embodiment.

FIG. 14 is a diagram comparing the three-stage precharge process (1200 V) and the single-stage precharge process (1200 V) of the electric vehicle including the power storage system 1 according to the second embodiment.

As shown in FIG. 14, in order to set the single-stage precharge and the three-stage precharge in the third voltage state (1200 V) to be completed at the same time, the first resistor R1 in the single-stage precharge in the third voltage state (1200 V) needs to be set to a resistance value six times higher than that of the first resistor R1 in the single-stage precharge in the first voltage state (400 V).

According to such a power storage system 1 according to the second embodiment, the voltage difference (maximum 400 V) between the battery 2 and the first smoothing capacitor C1 can be prevented, compared to a case where the battery 2 is set to the third voltage state (1200 V) from the beginning and the single-stage precharge is performed. Accordingly, the first smoothing capacitor C1 can be precharged without using a large precharge resistor or a high-output booster, and the first smoothing capacitor C1 can be precharged at a low cost.

Third Embodiment

Next, the power storage system 1 according to a third embodiment will be described with reference to FIGS. 15 to 18.

The power storage system 1 according to the third embodiment, like the second embodiment, includes the battery 2 that is configured to be switched between the first voltage state (400 V), the second voltage state (800 V), and the third voltage state (1200 V) by switching the connection state of the battery 2, but is configured to travel in the second voltage state (800 V) and be capable of charging in the first voltage state (400 V), the second voltage state (800 V), and the third voltage state (1200 V).

Specifically, the battery 2 according to the third embodiment includes first to sixth power storage units 21 to 26 and thirty-first to thirty-eighth contactors S/C_A, S/C_B, S/C_C, S/C_D, S/C_E, S/C_F, S/C_G, and S/C_H.

The first to sixth power storage units 21 to 26 are battery modules which can be charged and supply power at 400 V.

The thirty-first to thirty-eighth contactors S/C_A, S/C_B, S/C_C, S/C_D, S/C_E, S/C_F, S/C_G, and S/C_H constitute an example of the internal switch, and switch the connection states of the first to sixth power storage units 21 to 26.

For example, as shown in FIG. 16, when the thirty-first contactor S/C_A is turned on, the thirty-second contactor S/C_B is turned on, the thirty-third contactor S/C_C is turned on, the thirty-fourth contactor S/C_D is turned on, the thirty-fifth contactor S/C_E is turned on, the thirty-sixth contactor S/C_F is turned on, the thirty-seventh contactor S/C_G is turned off, and the thirty-eighth contactor S/C_H is turned off, the battery 2 becomes the first voltage state (400 V) in which the first to sixth power storage units 21 to 26 are connected in parallel, and is used for charging in the first voltage state (400 V) and for the first stage precharge of the three-stage precharge process.

As shown in FIG. 17, when the thirty-first contactor S/C_A is turned on, the thirty-second contactor S/C_B is turned on, the thirty-third contactor S/C_C is turned off, the thirty-fourth contactor S/C_D is turned off, the thirty-fifth contactor S/C_E is turned on, the thirty-sixth contactor S/C_F is turned on, the thirty-seventh contactor S/C_G is turned on, and the thirty-eighth contactor S/C_H is turned off, the battery 2 becomes the second voltage state (800 V) in which the first to third power storage units 21 to 23 connected in parallel and the fourth to sixth power storage units 24 to 26 connected in parallel are connected in series, and is used for traveling and charging in the second voltage state (800 V) and for the second stage precharge of the three-stage precharge process.

As shown in FIG. 18, when the thirty-first contactor S/C_A is turned off, the thirty-second contactor S/C_B is turned off, the thirty-third contactor S/C_C is turned on, the thirty-fourth contactor S/C_D is turned on, the thirty-fifth contactor S/C_E is turned off, the thirty-sixth contactor S/C_F is turned off, the thirty-seventh contactor S/C_G is turned on, and the thirty-eighth contactor S/C_H is turned on, the battery 2 becomes the third voltage state (1200 V) in which the first and second power storage units 21 and 22 connected in parallel, the third and fourth power storage units 23 and 24 connected in parallel, and the fifth and sixth power storage units 25 and 26 connected in parallel are connected in series, and is used for charging in the third voltage state (1200 V) and for the third stage precharge of the three-stage precharge process.

Although the various embodiments have been described above with reference to the drawings, it is needless to say that the present invention is not limited to these examples. It is apparent to those skilled in the art that various changes or modifications can be conceived within the scope described in the claims, and it is understood that the changes or modifications naturally fall within the technical scope of the present invention. In addition, respective constituent elements in the above-described embodiment may be freely combined without departing from the gist of the invention.

For example, in the present invention, in a case of charging at a high voltage, it is sufficient to set the battery to a low-voltage state by switching the internal switch to precharge the capacitor, and the power storage system (power supply circuit) can adopt any configuration. Although the two-stage and three-stage precharge methods have been exemplified, the precharging may be performed by switching to four or more stages. That is, in a generalized manner, if the battery 2 can be switched to n stages (n is an integer of 2 or more) having different outputable voltages by switching the internal switch, in a case of charging at an n-th voltage, the capacitor is precharged by setting the battery to a stepwise higher voltage state by switching the internal switch.

The case where the first voltage is set to 400 V, the second voltage is set to 800 V, and the third voltage is set to 1200 Vis exemplified, but the values of the first to third voltages can be set appropriately.

In the present specification, at least the following matters are described. Although corresponding constituent elements or the like in the embodiment described above are shown in parentheses, the present invention is not limited thereto.

(1) A precharge control method of an electric vehicle including a battery (battery 2) configured to be switched, by switching an internal switch (second to fourth contactors S/C_A, S/C_B, S/C_C), between a first voltage state (400 V start-up) capable of outputting a first voltage (400 V) and a second voltage state (800 V start-up) capable of outputting a second voltage (800 V) higher than the first voltage, the precharge control method including:

a first precharge step of, in a case of charging the battery at the second voltage, precharging a capacitor (first smoothing capacitor C1) under a condition of the battery in the first voltage state set by switching the internal switch.

According to (1), in a case of charging at the second voltage, the internal switch is switched to set the battery to the first voltage state to precharge the capacitor, so that the capacitor can be precharged without using a booster such as a DC-DC converter or a large precharge resistor. Accordingly, the capacitor can be precharged at a low cost.

(2) The precharge control method of an electric vehicle according to (1), further including:

after the first precharge step, a second precharge step of switching the internal switch to set the battery to the second voltage state and precharging the capacitor.

According to (2), by precharging in two stages, the capacitor can be precharged without using a large precharge resistor or a high-output booster, and the capacitor can be precharged at a low cost.

(3) The precharge control method of an electric vehicle according to (2), further including:

determining completion of the first precharge step in a case where a voltage of the capacitor becomes a voltage equivalent to the first voltage, to perform the second precharge step.

According to (3), an excessive current can be prevented from flowing through a precharge resistor.

(4) The precharge control method of an electric vehicle according to (3), wherein the second precharge step is performed after the completion of the first precharge step is determined and a predetermined time elapses.

According to (4), an excessive current can be prevented from flowing through a precharge resistor.

(5) The precharge control method of an electric vehicle according to (4), further including:

determining completion of the second precharge step in a case where the voltage of the capacitor becomes a voltage equivalent to the second voltage, and ending a precharge control.

According to (5), the precharge control can be completed appropriately.

(6) The precharge control method of an electric vehicle according to (1), in which the battery is configured to be switched between n stages (n is an integer equal to or greater than 2) having different outputable voltages by switching the internal switch, and in a case of charging at an n-th voltage, the internal switch is switched to set the battery to a stepwise higher voltage state to precharge the capacitor.

According to (6), in a case of charging at the n-th voltage, the internal switch is switched to set the battery to the stepwise higher voltage state to precharge the capacitor under the stepwise changed conditions, so that the capacitor can be precharged without using a large precharge resistor or a high-output booster. Accordingly, the capacitor can be precharged at a low cost.

(7) A power storage system (power storage system 1) of an electric vehicle, including:

a battery (battery 2) including a plurality of power storage units (first power storage unit 21, second power storage unit 22), and an internal switch (second to fourth contactors S/C_A, S/C_B, S/C_C) configured to switch a connection state of the plurality of power storage units to switch between a first voltage state (400 V start-up) capable of outputting a first voltage (400 V) and a second voltage state (800 V start-up) capable of outputting a second voltage (800 V) higher than the first voltage;

a three-phase motor (three-phase motor 3) in which coils of three phases (coils 32U, 32V, 32W) are connected at a neutral point (neutral point 31), the three-phase motor being driven by electric power supplied from the battery;

an inverter (inverter 5) connected on an electric power transmission path between the battery and the three-phase motor;

a DC power supply circuit (DC power supply circuits 13P, 13N) connected to a first connection portion (first connection portions 111P, 111N) positioned on an electric power transmission path between the inverter and the battery;

a capacitor (first smoothing capacitor C1) disposed between the first connection portion and the inverter; and a control unit (control unit 10) configured to control the internal switch, in which in a case of charging the battery at the second voltage, the control unit performs a first precharge process of setting the battery to the first voltage state and precharging the capacitor.

According to (7), in a case of charging at the second voltage, the internal switch is switched to set the battery to the first voltage state to precharge the capacitor, so that the capacitor can be precharged without using a booster such as a DC-DC converter. Accordingly, the capacitor can be precharged at a low cost.

(8) The power storage system according to (7), in which in a case of charging at the second voltage, the control unit performs the first precharge process, and after the first precharge process, performs a second precharge process of switching the internal switch to set the battery to the second voltage state and precharging the capacitor.

According to (8), by precharging in two stages, the capacitor can be precharged without using a large precharge resistor or a high-output booster, and the capacitor can be precharged at a low cost.

(9) The power storage system according to (8), further including:

a main switch (first contactor M/C) provided between the first connection portion and the plurality of power storage units; and a precharge resistor (first resistor R1) and a precharge switch (fifth contactor P/C) provided in parallel with the main switch and connected in series, in which in the first precharge process, the control unit turns off the main switch and turns on the precharge switch.

According to (9), the precharge circuit can be used to perform the precharging in the first precharge step.

(10) The power storage system according to (9), in which when switching from the first precharge process to the second precharge process, the control unit switches the internal switch while the precharge switch is turned on.

According to (10), when switching from the first pre-charge process to the second precharge process, it is sufficient to switch the internal switch, which makes the control easier.

REFERENCE SIGNS LIST

1 power storage system
2 battery
21 first power storage unit (power storage unit)
22 second power storage unit (power storage unit)
23 to 26 third to sixth power storage units (power storage unit)
3 three-phase motor
31 neutral point
32U, 32V, 32W coil
5 inverter
10 control unit
111P, 111N connection portion (first connection portion)
13P, 13N DC power supply circuit
C1 first smoothing capacitor
S/C_A, S/C_B, S/C_C second to fourth contactors (internal switch)
S/C_A1, S/C_A2, S/C_B1, S/C_B2, S/C_C1, S/C_C2 second-1 contactor to fourth-2 contactor (internal switch)
S/C_A, S/C_B, S/C_C, S/C_D, S/C_E, S/C_F, S/C_G, S/C_H thirty-first to thirty-eighth contactors (internal switch)
P/C fifth contactor (precharge switch)
M/C first contactor (main switch)
R1 first resistor (precharge resistor)

What is claimed is:

1. A pre-charge control method for an electric vehicle including: a battery configured to be switched, by switching an internal switch, between a first voltage state capable of outputting a first voltage and a second voltage state capable of outputting a second voltage higher than the first voltage; and a capacitor, the pre-charge control method comprising:

during charging the battery at the second voltage by electric power supplied from an external power supply via a DC power supply circuit and from a state in which a voltage of the capacitor is lower than the first voltage, precharging the capacitor under a condition of the battery in the first voltage state set by switching the internal switch.

2. The pre-charge control method according to claim 1, further comprising:

after the precharging of the capacitor under the condition of the battery in the first voltage state, precharging the capacitor under a condition of the battery in the second voltage state set by switching the internal switch.

3. The pre-charge control method according to claim 2, further comprising:

determining, when a voltage of the capacitor becomes a voltage equivalent to the first voltage, that the precharging of the capacitor under the condition of the battery in the first voltage state is completed to perform the precharging of the capacitor under the condition of the battery in the second voltage state.

4. The pre-charge control method according to claim 3, wherein after a predetermined time elapses from the determining, the precharging of the capacitor under the condition of the battery in the second voltage state is performed.

5. The pre-charge control method according to claim 4, further comprising:

determining, when the voltage of the capacitor becomes a voltage equivalent to the second voltage, that the pre-charging of the capacitor under the condition of the battery in the second voltage state is completed, and ending a pre-charge control for the electric vehicle.

6. The pre-charge control method according to claim 1, wherein the battery is configured to be switched between n stages having different outputable voltages by switching the internal switch, in which n is an integer equal to or greater than 2, and during charging the battery at an n-th voltage, the internal switch is switched to set the battery to a stepwise higher voltage state to pre-charge the capacitor.

7. A power storage system of an electric vehicle, comprising:

a battery including a plurality of power storages, and an internal switch configured to switch a connection state of the plurality of power storages to switch between a first voltage state capable of outputting a first voltage and a second voltage state capable of outputting a second voltage higher than the first voltage;

a three-phase motor in which coils of three phases are connected at a neutral point, the three-phase motor being driven by electric power supplied from the battery;

an inverter connected on an electric power transmission path between the battery and the three-phase motor;

a DC power supply circuit connected to a first connection portion positioned on an electric power transmission path between the inverter and the battery;

a capacitor disposed between the first connection portion and the inverter; and a controller configured to control the internal switch, wherein the controller is configured, during charging the battery at the second voltage by electric power supplied from an external power supply via a DC power supply circuit and from a state in which a voltage of the capacitor is lower than the first voltage, to perform a first pre-charge process of precharging the capacitor under a condition of the battery set to the first voltage state.

8. The power storage system according to claim 7, wherein the controller is configured, during charging the battery at the second voltage, to perform the first pre-charge process, and after the first pre-charge process, perform a second pre-charge process of switching the internal switch to set the battery to the second voltage state and precharging the capacitor.

9. The power storage system according to claim 8, further comprising:

a main switch provided between the first connection portion and the plurality of power storages; and a pre-charge resistor and a pre-charge switch which are provided in parallel with the main switch and are connected in series, wherein the controller is configured to, in the first pre-charge process, turn off the main switch and turn on the pre-charge switch.

10. The power storage system according to claim 9, wherein the controller is configured to, when switching from the first pre-charge process to the second pre-charge process, switch the internal switch under a condition where the pre-charge switch is on.

* * * * *